US008046419B2

(12) United States Patent  (10) Patent No.: US 8,046,419 B2
Chung et al.  (45) Date of Patent: Oct. 25, 2011

(54) METHOD OF PROCESSING OPEN ASYNCHRONOUS APPLICATION SERVICE EVENT AND OPEN WEB SERVICE GATEWAY IMPLEMENTING THE SAME

(75) Inventors: Ki Sook Chung, Daejeon (KR); Young Il Choi, Daejeon (KR); Byung Sun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 945 days.

(21) Appl. No.: 11/947,363

(22) Filed: Nov. 29, 2007

(65) Prior Publication Data
US 2008/0133683 A1  Jun. 5, 2008

(30) Foreign Application Priority Data

Dec. 1, 2006 (KR) .......... 10-2006-0120968
Aug. 16, 2007 (KR) .......... 10-2007-0082152

(51) Int. Cl.
*G06F 15/16* (2006.01)
(52) U.S. Cl. ............ 709/207; 709/206
(58) Field of Classification Search .......... 709/206, 709/207
See application file for complete search history.

(56) References Cited

U.S. PATENT DOCUMENTS

| | | | |
|---|---|---|---|
| 7,221,945 B2 * | 5/2007 | Milford et al. | 455/452.1 |
| 2003/0061268 A1 | 3/2003 | Moerdijk et al. | |
| 2004/0028031 A1 * | 2/2004 | Valin et al. | 370/352 |
| 2004/0242186 A1 * | 12/2004 | Thanh et al. | 455/403 |
| 2005/0111650 A1 * | 5/2005 | Baratz et al. | 379/221.08 |
| 2005/0132381 A1 | 6/2005 | Fiammante et al. | |
| 2006/0133420 A1 * | 6/2006 | Chung et al. | 370/469 |
| 2007/0100981 A1 * | 5/2007 | Adamczyk et al. | 709/223 |
| 2008/0146201 A1 * | 6/2008 | O'Neill et al. | 455/414.1 |

FOREIGN PATENT DOCUMENTS

| | | |
|---|---|---|
| EP | 1411737 A1 | 4/2004 |
| KR | 1020050061130 A | 6/2005 |
| KR | 1020060066433 A | 6/2006 |
| WO | WO 03/058474 A1 | 7/2003 |
| WO | WO 2004/107197 A1 | 12/2004 |

* cited by examiner

*Primary Examiner* — Kevin Bates
*Assistant Examiner* — Robert B McAdams (57) ABSTRACT

A method of processing an open asynchronous application service event and an open web service gateway implementing the method are provided. The open web service gateway includes: a plurality of SCFs (service capability features) operatively connected to an application service through a web service interface, receives an event registration request from the application service, and notifies an event occurring in a network to the application service; and an event broker registering the registration-requested based on a predetermined policy in correspondence with the SCFs, when the registration-requested event received from the application service is an asynchronous event, and notifies an occurrence of the event in the network to the SCFs according to a registered priority of the event. Accordingly, an asynchronous event is registered and notified based on a predetermined policy, so that it is possible to prevent event registration conflict between the SCFs and between the application services and to maximize network operation efficiency.

18 Claims, 7 Drawing Sheets

| REGISTRATION NUMBER | TERMINAL NUMBER | EVENT | REGISTRATION SCF | ENDPOINT | REGISTRATION DATE | PRIORITY |
|---|---|---|---|---|---|---|
| 1 | 01X-XXXX-XXXX | Busy | CallNotofication | http://yyy.yyy.yy | 2006-01-01 | 1 |
| 2 | 02-XXXX-XXXX | CalledNumber | CallHandling | http://yyy.yyy.yy | 2006-02-01 | 0 |
| 3 | 042-XXX-XXXX | Presence | Presence | http://yyy.yyy.yy | 2006-05-30 | 0 |
| 4 | 01X-XXXX-XXXX | LocationChanged | TerminalLocation | http://yyy.yyy.yy | 2006-10-10 | 2 |
| ... | ... | ... | ... | ... | ... | ... |

METHOD OF PROCESSING OPEN ASYNCHRONOUS APPLICATION SERVICE EVENT AND OPEN WEB SERVICE GATEWAY IMPLEMENTING THE SAME

CROSS-REFERENCE TO RELATED APPLICATIONS

This application claims the priorities of Korean Patent Application No. 10-2006-0120968 filed on Dec. 1, 2006, and No. 10-2007-0082152 filed on Aug. 16, 2007 in the Korean Intellectual Property Office, the disclosure of which is incorporated herein by reference.

BACKGROUND OF THE INVENTION

1. Field of the Invention

The present invention relates to a method of processing an open asynchronous application service event and an open web service gateway implementing the method, and more particularly, to a method of processing an open asynchronous application service event capable of registering and notifying an asynchronous event based on a predetermined policy and an open web service gateway implementing the method. This work was supported by the IT R&D program of MIC/IITA [Project No. 2005-S-056-02, Project Name: Development of Open API and Service Platform Technologies].

2. Description of the Related Art

In general, in an open system, an open web service gateway provides a standard web service application programming interface (API), so that a third party service provider can easily generate a service without knowledge of low layers of a network. In addition, the open web service gateway provides functions such as presence information notification, terminal state notification, terminal location notification, call notification, and SMS message transmission in units of service capability feature (SCF).

The open web service gateway provides an interface to an application service which is to use the SCF, so that the application service can invoke the API in a web service format. Operations for processing the API that is invoked by the application service are divided into synchronous and asynchronous operations according to functions of the SCF.

The asynchronous operation is performed to notify presence, terminal state, terminal location, call, or other events which occur in the network.

In addition, before the event notification, the application service needs register event conditions in advance by using the API provided from the open web service gateway.

More specifically, in the asynchronous operation, the application service registers a specific event in the open web service gateway in advance. When the registered event occurs in the network, the SCF associated with the event notifies the generation of the event to the application service.

However, in a conventional event registration procedure, an event having the same event condition may be registered by a plurality of application services. In this case, event notification conflict occurs.

Therefore, according to a feature of an application service or an event, the application service is designed to be invoked one time per event. Otherwise, different events are designed to be sequentially notified to different application services. However, in event registration logic, the event notification conditions are not considered.

Therefore, in a case where, the registered event is generated from a plurality of the application services without any arbitration, unpredicted event notification may be performed, so that conflict of event notification between application services or between SCFs in the open web service gateway may occur. Accordingly, there is a need for a method and apparatus capable of preventing the event notification conflict.

SUMMARY OF THE INVENTION

An aspect of the present invention provides a method of processing an open asynchronous application service event and an open web service gateway implementing the method capable of notifying an event without conflict between application services and between SCFs (service capability features) in the open web service gateway.

According to an aspect of the present invention, there is provided an open web service gateway comprising: a plurality of SCFs (service capability features) operatively connected to an application service through a web service interface, receiving an event registration request from the application service, and notifying an event occurring in a network to the application service; and an event broker registering the registration-requested based on a predetermined policy in correspondence with the SCFs, when the registration-requested event received from the application service is an asynchronous event, and notifying an occurrence of the event in the network to the SCFs according to a registered priority of the event.

In the above aspect of the present invention, when an event registration conflict is predicted in the registration of the registration-requested event received from the application service due to existence of registration information on an event equal to the registration-requested event, the event broker may determine an event registration priority based on a policy corresponding to the predicted conflict to register the event.

In the above aspect of the present invention, the event registration information includes at least one of the event information, event-associated terminal number information, event registration SCF information, EndPoint information, registration date information, and priority information.

In addition, the event broker may use the information of the event that occurs in the network and the event-associated terminal number as a triggering condition to determine the event registration information corresponding to the triggering condition and notifies the occurrence of the event to the SCF included in the determined event registration information.

In addition, when the number of event registration information corresponding to the triggering condition is one, the event broker may notify the occurrence of the event to the SCF included in the one registration information, and when the number of event registration information corresponding to the triggering condition is two or more, the event broker may sequentially notify the occurrence of the event to the SCFs included in the two or more registration information according to the priorities of the registration information.

In addition, when the number of event registration information corresponding to the triggering condition is two or more, the event broker may determine the priorities of the registration information, when there is registration information having a priority of 0, the event broker may notify the occurrence of the event to the SCF included in the registration information having the priority of 0, and when there is no registration information having the priority of 0, the event broker may sequentially notify the occurrence of the event to the SCFs included in the registration information according to the priorities of the registration information.

In addition, when there is no registration information having the priority of 0, the event broker may determine whether or not the number of the SCFs included in the registration information is two or more, when the number of the SCFs is two or more, the event broker may sequentially notify the occurrence of the event to the SCFs included in the registration information according to the priorities of the registration information, and when the number of the SCFs is one, the event broker may transmit a plurality of the event information corresponding to the registration information and the priority information thereof to the one SCF.

In addition, when a plurality of the event information and the priority information are transmitted from the event broker, the SCF sequentially transmits the events of the registration information to the application service in the order of the priorities included in the priority information.

In addition, the SCF may comprise: a web service processing unit providing the web service interface to the application service so that the application service can access to the SCF, and a logic processing unit determining the registration-requested event received from the accessed application service to identify asynchronous and synchronous events, transmitting the registration request of the event identified as the asynchronous event to the event broker, and transmits the notification-requested event received from the event broker to the application service.

In addition, the open web service gateway may further comprise a policy DB storing a plurality of policy data corresponding to the policy.

In addition, the open web service gateway may further comprise a gateway OAM (operation-and-maintenance) processing unit generating, modifying, and removing the policy data.

According to another aspect of the present invention, there is provided a method of processing an open asynchronous application service event including a plurality of SCFs (service capability features), the method comprising: receiving an event registration request transmitted from an application service through the SCF; an event registration of, registering the registration-requested event according to the SCF based on a predetermined policy when the event received through the SCF is an asynchronous event; receiving an event occurring in a network; and event notification of notifying the event occurring in the network to the application service according to a registered priority through the SCF.

In the above aspect of the present invention, the event registration may comprise: determining whether or not registration information on an event equal to the registration-requested event exists previously; and when an event registration conflict is predicted in the registration of the registration-requested event due to the existence of the event equal to the registration-requested event, determining an event registration priority based on a policy corresponding to the predicted conflict to register the event.

In addition, in the registration, event registration information may include at least one of the event information, event-associated terminal number information, event registration SCF information, EndPoint information, registration date information, and priority information is registered.

In addition, the event notification may comprise using the information of the event that occurs in the network and the event-associated terminal number as a triggering condition to determine the event registration information corresponding to the triggering condition; and notifying the event that occurs in the network to the application service through the SCF included in the determined event registration information.

In addition, in the event notification, when the number of event registration information corresponding to the triggering condition is one, the event that occurs in the network may be notified to the application service through the SCF included in the one registration information.

In addition, the event notification may comprise: when the number of the event registration information corresponding to the triggering condition is two or more, determining the priority of the registration information and determining whether or not there is registration information having a priority of 0; when there is registration information having the priority of 0, notifying the event that occurs in the network to the application service through the SCF included in the registration information and, when there is no registration information having the priority of 0, determining whether or not the number of the SCFs included in the registration information is two or more; and when the number of the SCFs included in the registration information is two or more, sequentially notifying the event that occurs in the network to the application service through the SCF included in the registration information according the priority of the registration information.

In addition, the event notification may further comprise, when the number of the SCFs determined from the registration information is one, SCF's sequentially notifying the event of the registration information to the application service in the order of the priority according to priority information of the registration information.

According to the method and apparatus for processing an open asynchronous application service event, an asynchronous event is registered and notified based on a predetermined policy, so that it is possible to prevent event registration conflict between the SCFs and between the application services and to maximize network operation efficiency.

In addition, according to the method and apparatus for processing an open asynchronous application service event, a priority for event notification is determined based on a policy set by a network operator, so that it is possible to easily perform a dynamical change of the event notification policy.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, exemplary embodiments of the present invention will now be described in detail with reference to the accompanying drawings. For clarifying of the present invention, description of well-known functions, structures, configuration, or constructions may be omitted.

In the accompanying drawings, like reference numerals denote like elements.

Figure 1:
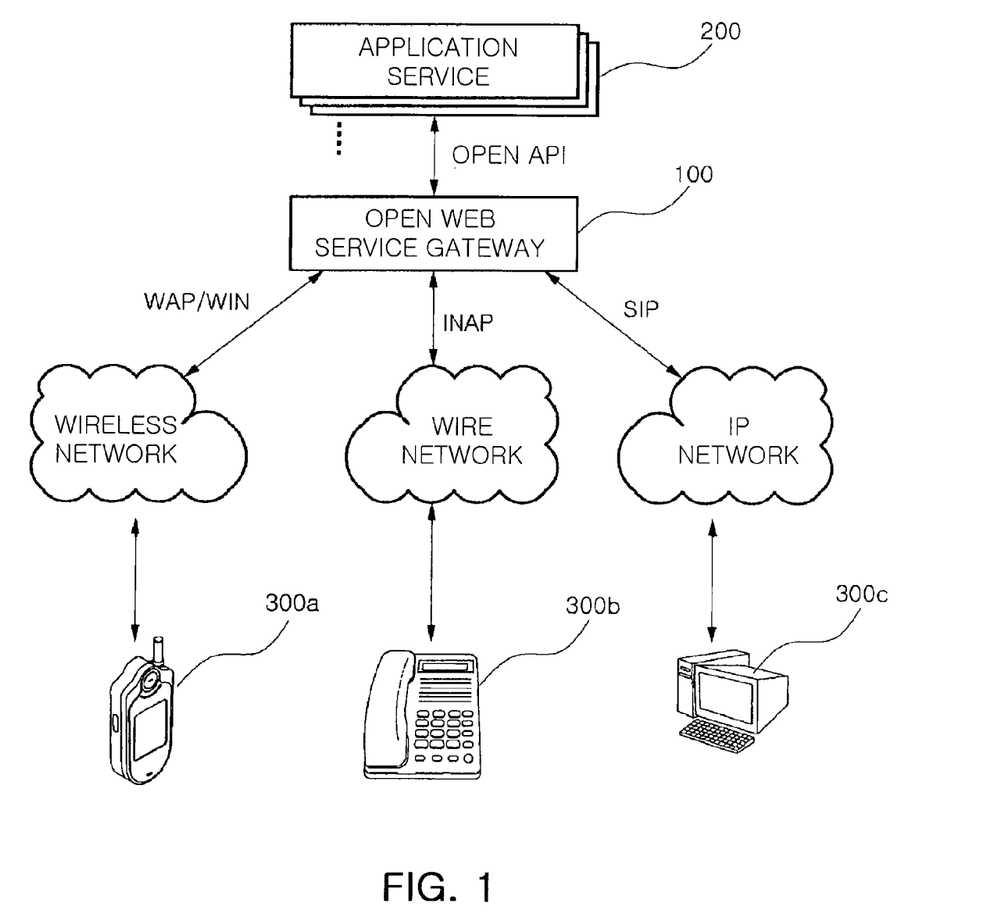
FIG. 1 is a schematic view illustrating a network configuration of an open system according to an embodiment of the present invention.

FIG. 1 is a schematic view illustrating a network configuration of an open system according to an embodiment of the present invention.

Referring to FIG. 1, the open system includes an open web service gateway 100, application service 200, terminals 300a, 300b, and 300c which are connected to a wire network, a wireless network, and an Internet Protocol (IP) network.

The open web service gateway 100 provides an interface through which the application service 200 can invoke an application programming interface (API) in a web service format so as to use service capability features (SCFs) which is set therein. The open web service gateway 100 abstract functions for the wire, wireless, and IP networks as open APIs and provides the APIs in the web service format.

The open web service gateway 100 can be operatively connected to at least one open application service 200. In addition, the open web service gateway 100 can be operatively connected to at least one protocol such as a wireless application protocol/wireless intelligent network (WAP/WIN), an intelligent network application protocol (INAP), and session initiation protocol (SIP) so as to provide the web service to a plurality of networks.

The open web service gateway 100 provides functions of three-way calling connection, call event notification, short message service (SMS)/multimedia message transmission, presence information notification, terminal state information notification, terminal location notification, and the like, in which the different functions are implemented by using different SCFs.

The application service 200 performs an open application service by using an application service logic and the open API in cooperation with the open web service gateway 100.

When the application service 200 requests for registration of an event, the open web service gateway 100 registers an event according to a predetermined policy. When an event occurs in a network, the open web service gateway 100 notifies the event to the application service 200 according to a registered priority of the event.

Now, the open web service gateway 100 is described more in detail.

Figure 2:
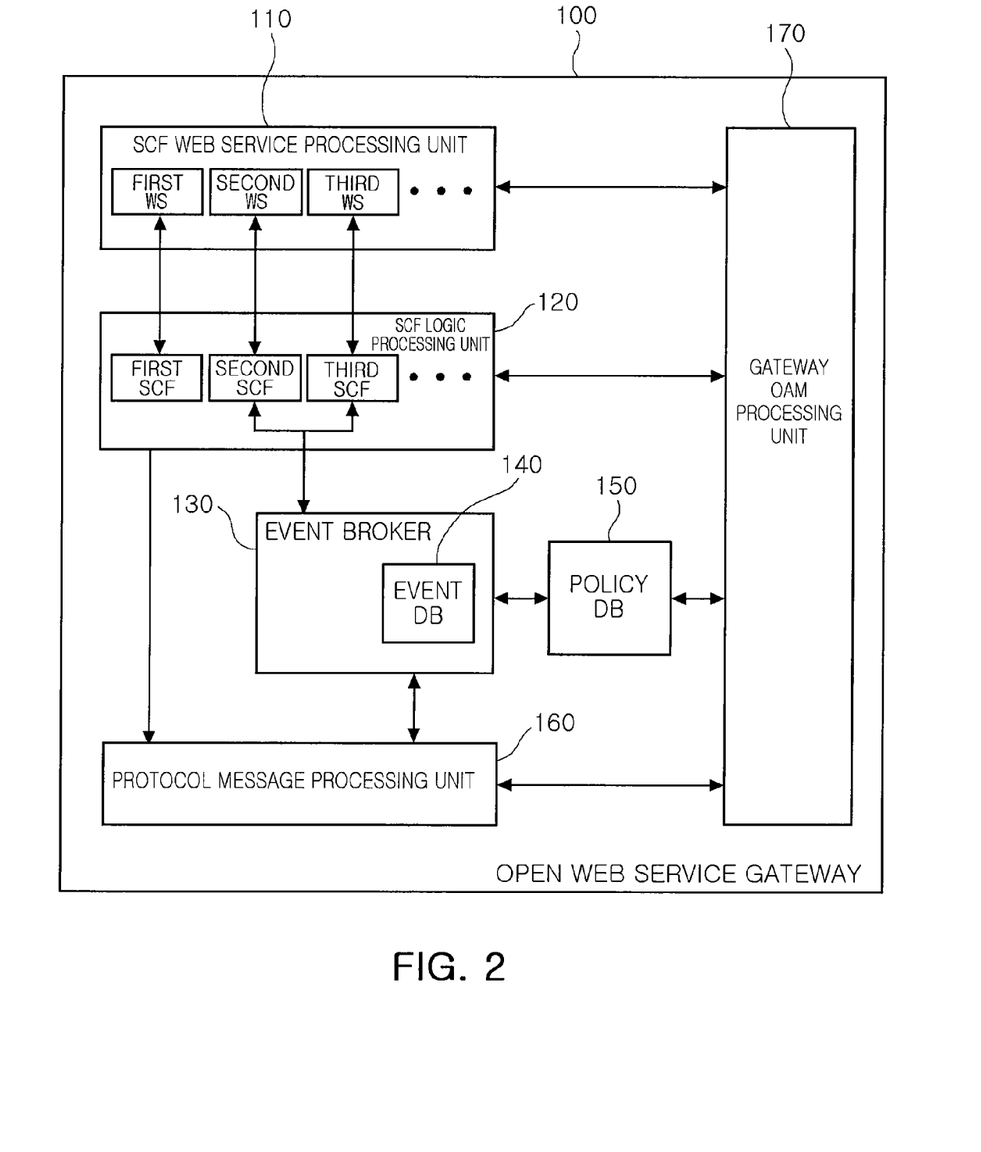
FIG. 2 is a block diagram illustrating a configuration of an open web service gateway according to an embodiment of the present invention.

FIG. 2 is a block diagram illustrating a configuration of the open web service gateway according to the embodiment of the present invention.

As shown in FIG. 2, the open web service gateway 100 is constructed with a plurality of SCFs including a web service processing unit 110 and a logic processing unit 120, an event broker 130 including an event DB 140, a policy DB 150, a protocol message processing unit 160, and gateway operation-and-maintenance (OAM) processing unit 170.

In the open web service gateway 100, the web service processing unit 110 of each SCF provides the web service interface to the application service 200, so that the application service 200 can be connected to the open web service gateway 100 through the web service interface.

The logic processing unit 120 performs SCF functions such as presence information notification, terminal state information notification, terminal location notification, call notification, and SMS message transmission. The logic processing unit 120 implements an event registration processing logic in response to an event registration request of the application service 200 that is transmitted through the web service processing unit 110.

The event broker 130 implements an event registration logic in response to the event registration request which is transmitted from an SCF which is to be subject to an asynchronous operation process, that is, an SCF which performs event registration and notification functions. The event broker 130 implements an event notification logic for an event which occurs in the network. Therefore, the event broker 130 allows the event to be registered and notified based on a policy of the policy DB 150 that is described later.

The event broker 130 manages registration information of an registration-request event by using the event DB 140. The registration information is arbitrated based on policy data acquired from the policy DB 150.

For the implementation of the event registration logic associated with the event registration request, the event broker 130 checks conflict between the registration-requested event and event registration information stored in the event DB 140. If there is conflict, the conflict is resolved according to a policy searched from the policy DB 150, and after that, the registration-requested event is registered.

The policy DB 150 stores and manages the policy data that a network operator inputs through the gateway OAM processing unit 170.

The protocol message processing unit 160 provides to the network the registration-requested event, of which registration is requested by the application service 200. The protocol message processing unit 160 notifies to the SCFs the events that occur in the network.

Now, the event registration information of the open web service gateway 100 is described in detail.

Figure 3:
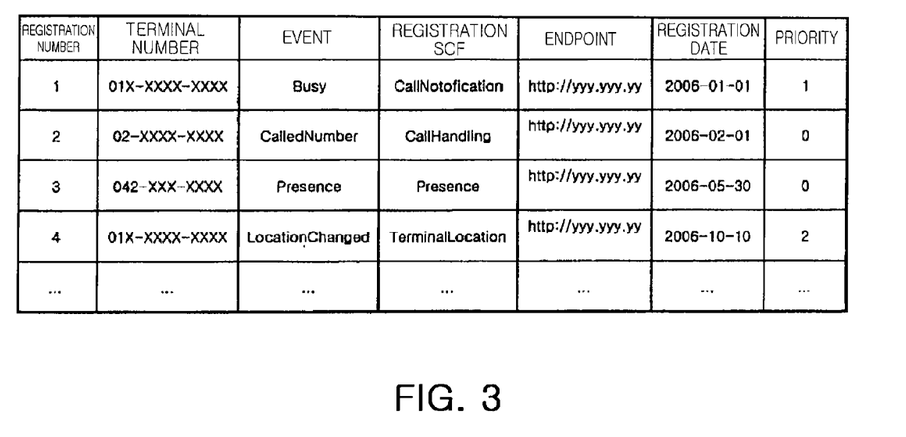
FIG. 3 is an event registration information table according to an embodiment of the present invention.

FIG. 3 is an event registration information table according to the embodiment of the present invention.

The event registration information table is managed in the event DB 140.

Referring to FIG. 3, the event registration information is managed in a formation of table. The event registration information includes event information, event-associated terminal number information, event registration SCF information, EndPoint information, registration date information, priority information, and the like. The event-associated terminal number information and the event information are used as event-triggering conditions. The conditions of the notification-requested event information are checked and notified to the notification-requested event registration SCF.

In the event registration information table, the priority information and the registration date information are used for the event broker 130 sequentially notifying to the SCFs the events of which event-triggering conditions occur.

More specifically, the event broker 130 allocates the highest priority to the priority-0 event, so that the event can be notified exclusively. The event broker 130 notifies events except for the priority-0 event in the order of registration date and priority.

Now, operations of the open web service gateway 100 performing the event registration and notification is described in detail.

Figure 4:
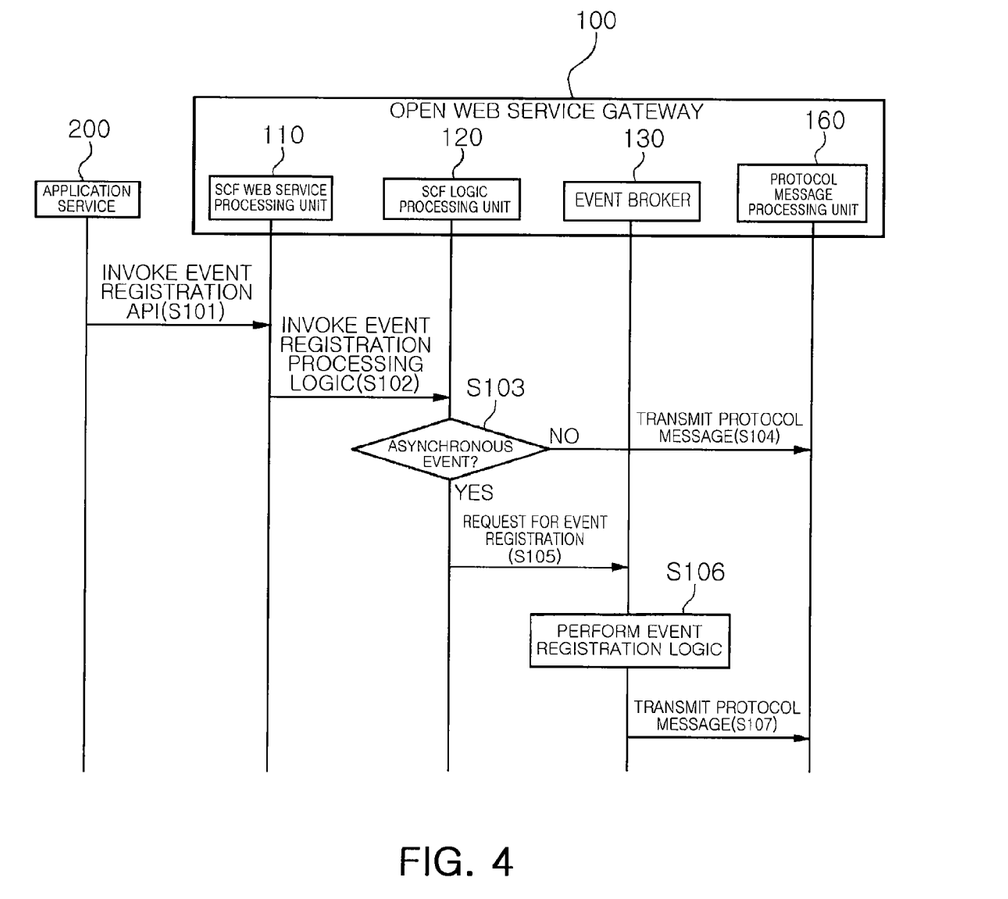
FIG. 4 is a signal flowchart illustrating an asynchronous event registration procedure of the open web service gateway according to the embodiment of the present invention.

FIG. 4 is a signal flowchart illustrating an asynchronous event registration procedure of the open web service gateway according to the embodiment of the present invention.

As shown in FIG. 4, when the application service 200 is to generate an event in the network, the application service 200 accesses the SCF web service processing unit 110 of the open web service gateway 100 through the web service interface to invoke the event registration API for the event registration request (S101).

When the application service 200 requests for the event registration, the web service processing unit 110 invokes an event registration processing logic of the logic processing unit 120 in response to the event registration request of the application service 200 (S102). In the implementation of the event registration processing logic, the logic processing unit 120 determines whether the registration-requested event of the application service 200 is to be subject to asynchronous or synchronous operation process (S103).

If the registration-requested event condition of the application service 200 is determined to be synchronous through the event registration processing logic, the logic processing unit 120 transmits the registration-requested event to the protocol message processing unit 160 by using a protocol message to provide the event to the network (S104). If the registration-requested event condition of the application service 200 is determined to be asynchronous through the event registration processing logic, the logic processing unit 120 requests the event broker 130 to perform the event registration (S105).

When the event registration is requested by the SCF logic processing unit 120, the event broker 130 performs the event registration logic based on the policy information acquired from the policy DB 150 to register the event (S106).

When the registration-requested event is registered in the event DB 140 according to the event registration logic, the event broker 130 transmits the registered event to the protocol message processing unit 160 by using the protocol message to provide the event to the network (S107).

Figure 5:
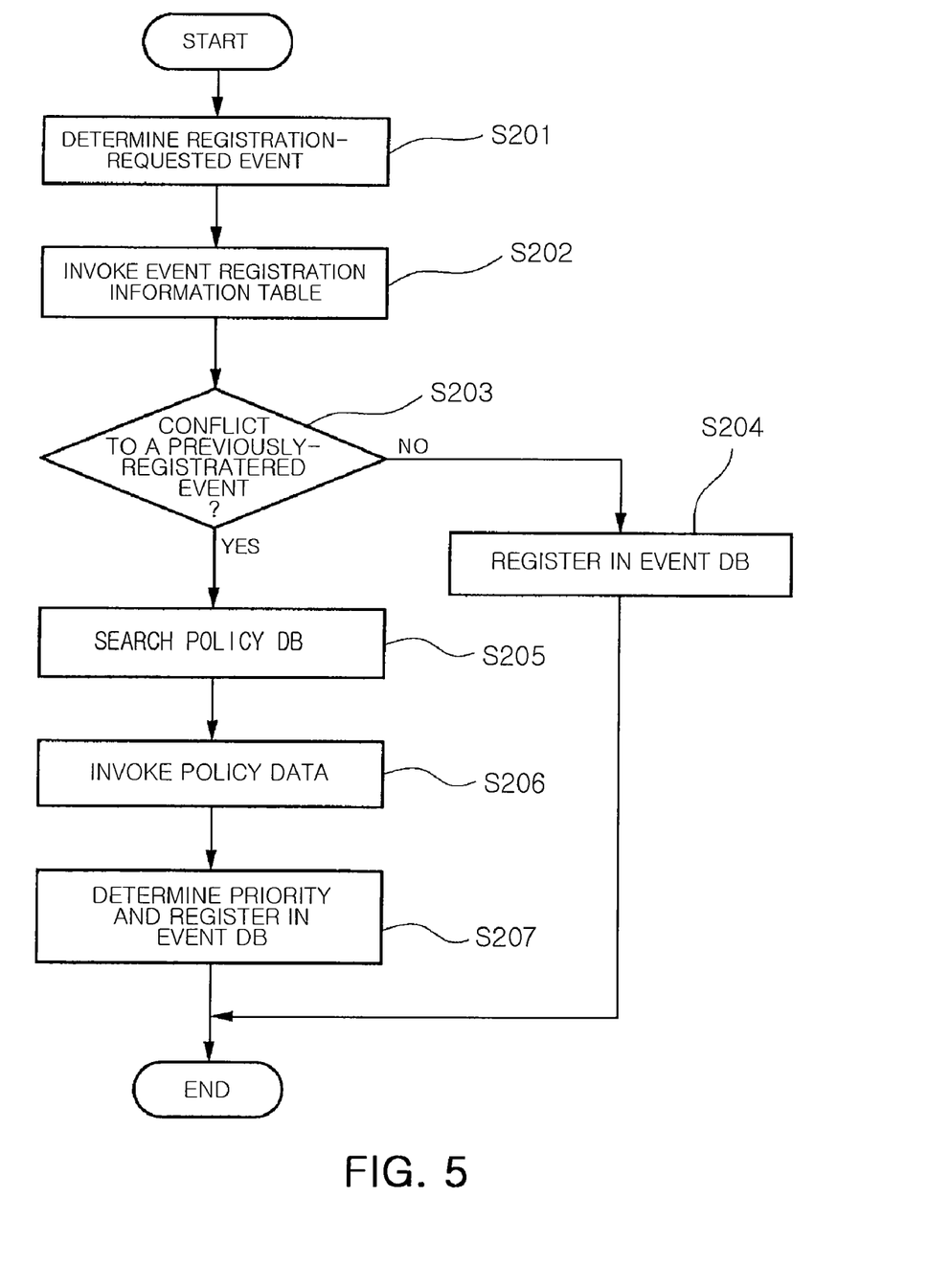
FIG. 5 is a flowchart of an event registration logic of the open web service gateway according to the embodiment of the present invention.

FIG. 5 is a flowchart of an event registration logic of the open web service gateway 100 according to the embodiment of the present invention.

The event registration logic shown in FIG. 5 is an event registration logic performed by the event broker 130 of the open web service gateway 100.

Referring to FIG. 5, when the event registration is requested by the SCF logic processing unit 120, the event broker 130 checks the registration-requested event (S201). Next, the event broker 130 invokes the event registration information table from the event DB 140 (S202).

Next, the event broker 130 determines whether or not event information equal to the registration-requested event exists in the invoked event registration information table (S203). If the event information equal to the registration-requested event is determined not to exist, the event broker 130 registers the registration-requested event in the event DB 140 (S204).

However, if the event information equal to the registration-requested event exists in the event registration information table, the registration-requested event may cause event registration conflict. Therefore, if the event information equal to the registration-requested event is determined to exist, the event broker 130 searches the policy DB 150 (S205) and invokes the policy data corresponding to the predicted event registration conflict (S206).

The event registration conflict may be event registration conflict in one SCF, event registration conflict between SCFs, or event registration conflict between application services 200.

In other words, the event registration conflict may occur in a case where a registration-requested event of SCF exists previously, a case where a registration-requested event of an arbitrary is previously registered in another SCF, or a case where a registration-requested event of an application service 200 exists previously.

The event broker 130 determines an event registration priority based on the invoked policy and registers the registration-requested event together with the determined priority information in the event DB 140 (S207).

When the event registration priority cannot be determined based on the invoked policy data, the event broker 130 accesses and requests the gateway OAM processing unit 170 to supplement the invoked policy.

Figure 6:
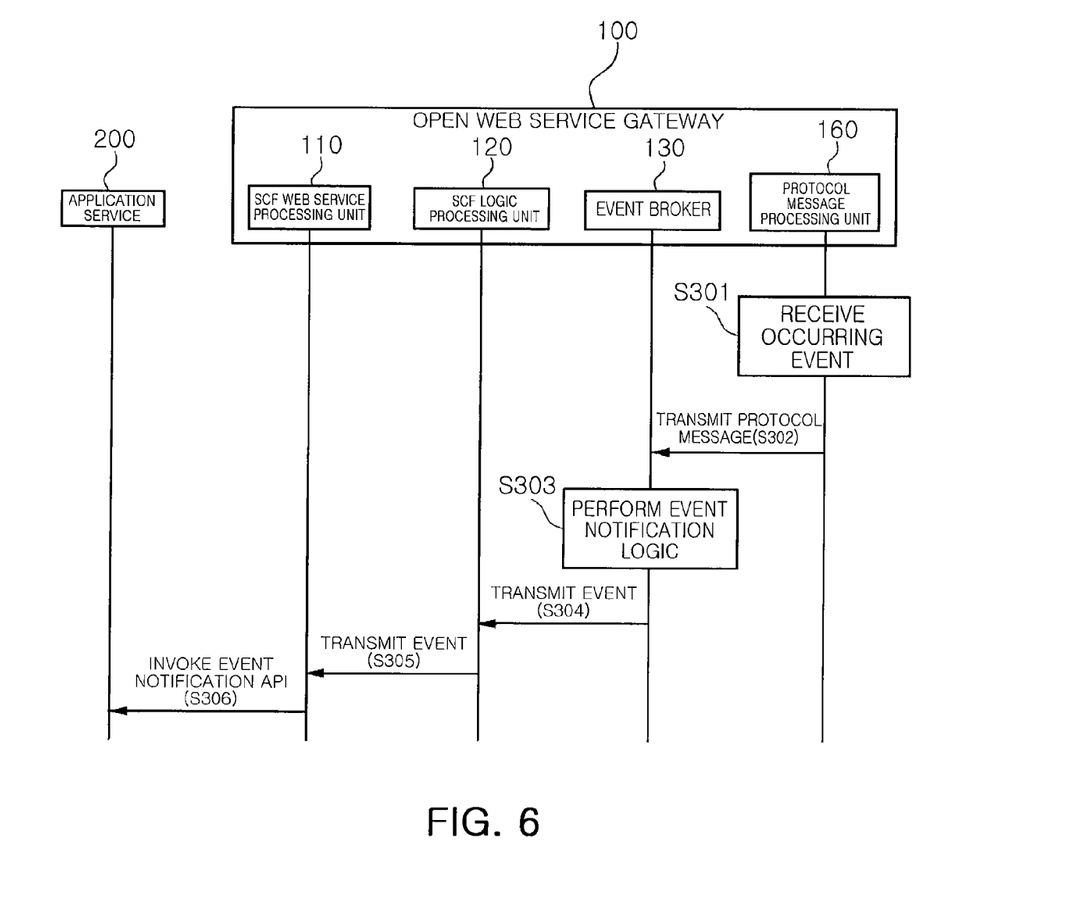
FIG. 6 is a signal flowchart illustrating an event notification procedure of the open web service gateway according to the embodiment of the present invention.

FIG. 6 is a signal flowchart illustrating an event notification procedure of the open web service gateway 100 according to the embodiment of the present invention.

As shown in FIG. 6, when the event occurs in the network (S301), the protocol message processing unit 160 of the open web service gateway 100 transmits the received event to the event broker 130 by using a protocol message (S302).

When the event is transmitted from the protocol message processing unit 160, the event broker 130 performs an event notification logic (S303). Next, the event broker 130 transmits the event to an SCF that is determined to be a destination of the event transmission according to the event notification logic (S304).

The SCF receives the event from the event broker 130 through the logic processing unit 120. The SCF determines the application service 200 that is to be notified with the received event. The SCF allows the web service processing unit 110 to perform the event notification to the determined application service 200 in response to invoke of the event notification API (S305 and S306).

Figure 7:
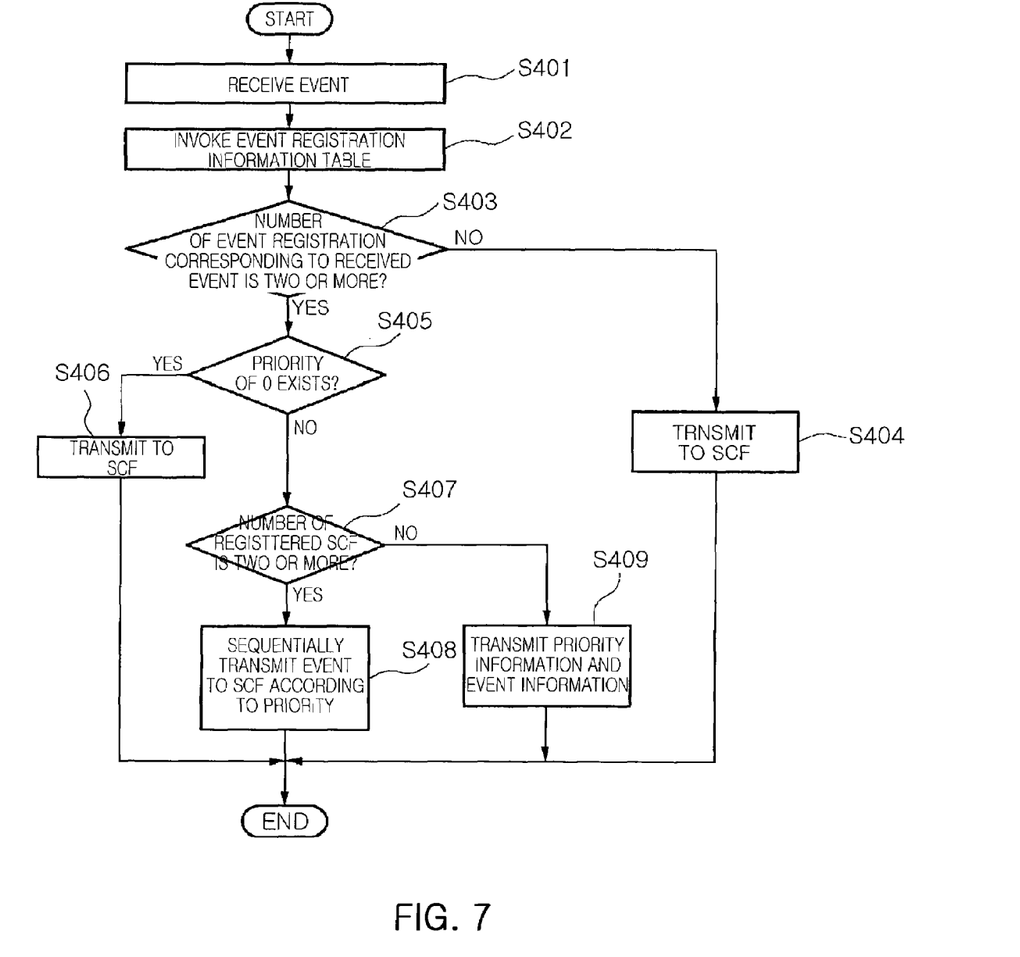
FIG. 7 is a flowchart of an event notification logic of the open web service gateway according to the embodiment of the present invention.

FIG. 7 is a flowchart of an event notification logic of the open web service gateway 100 according to the embodiment of the present invention.

The event notification logic shown in FIG. 7 is an event notification logic performed by the event broker 130 of the open web service gateway 100.

Referring to FIG. 7, when the event is received from the protocol message processing unit 160 (S401), the event broker 130 invokes the event registration information table from the event DB 140 (S402).

The event broker 130 determines based on the registration information corresponding to the received event in the event registration information table whether or not the number of registration information is equal to or larger than two (S403).

If the number of registration information corresponding to the received event is determined to be one, the event broker 130 transmits the received event to the SCF included in the registration information (S404).

If the number of registration information corresponding to the received event is determined to be equal to or larger than two, the event broker 130 determines whether or not there is registration information having a priority of 0 (S405).

If there is registration information having a priority of 0, the event broker 130 transmits the received event to the SCF included in the registration information (S406). If there is no registration information having a priority of 0, the event broker 130 determines whether or not the number of the SCFs that are determined from the registration information corresponding to the received event is two or more (S407).

If the number of SCFs included in the registration information corresponding to the received event is determined to be equal to or larger than two, the event broker 130 sequentially transmits the received event to the SCFs included in the registration information according to the priority of the registration information (S408).

If the number of SCFs included in the registration information corresponding to the received event is determined to be one, the event broker 130 determines that the registration information is generated from one SCF and transmits the event information and the priority information included in the registration information to the SCF (S409).

Accordingly, the SCF can sequentially transmit the events to the application service 200 in the order of priority of the registration information that is transmitted from the event broker 130.

While the present invention has been shown and described in connection with the exemplary embodiments, it will be apparent to those skilled in the art that modifications and variations can be made without departing from the spirit and scope of the invention as defined by the appended claims.

What is claimed is:

1. An open web service gateway comprising:
   a memory;
   a plurality of service capability features (SCF) processors operatively connected to an application service through a web service interface, and configured to receive a registration request for a first event from the application service and to notify a second event occurring in a network to the application service; and
   an event broker configured to register the first event based on a predetermined policy in correspondence with the SCF processors if the first event received from the application service is an asynchronous event, and to notify an occurrence of the second event in the network to a corresponding SCF processor according to a registered priority of the second event.

2. The open web service gateway of claim 1, wherein, when an event registration conflict is predicted in the registration of the first event due to existence of event registration information on an event equal to the first event, the event broker determines an event registration priority based on a policy corresponding to the predicted conflict to register the first event.

3. The open web service gateway of claim 2, wherein the event registration information includes one or more of event information, event-associated terminal number information, event registration SCF information, EndPoint information, registration date information, and priority information.

4. The open web service gateway of claim 3, wherein when the second event is occurred in the network, the event broker uses information of the second event and an event-associated terminal number as a triggering condition to determine event registration information corresponding to the triggering condition and notifies the occurrence of the second event to an SCF processor corresponding to the determined event registration information.

5. The open web service gateway of claim 4,
   wherein, when the number of the event registration information corresponding to the triggering condition is one, the event broker notifies the occurrence of the second event to an SCF processor corresponding to the one event registration information, and
   wherein, when the number of the event registration information corresponding to the triggering condition is two or more, the event broker sequentially notifies the occurrence of the second event to SCF processors corresponding to the two or more event registration information according to priorities of the two or more event registration information.

6. The open web service gateway of claim 5,
   wherein, when the number of the event registration information corresponding to the triggering condition is two or more, the event broker determines the priorities of the two or more event registration information,
   wherein, if there is event registration information having a priority of 0, the event broker notifies the occurrence of the second event to an SCF processor corresponding to the event registration information having the priority of 0, and
   wherein, if there is no event registration information having the priority of 0, the event broker sequentially notifies the occurrence of the second event to the SCF processors corresponding to the two or more event registration information according to the priorities of the two or more event registration information.

7. The open web service gateway of claim 6,
   wherein, when there is no event registration information having the priority of 0, the event broker determines whether or not the number of the SCF processors corresponding to the two or more event registration information is two or more,
   wherein, if the number of the SCF processors is two or more, the event broker sequentially notifies the occurrence of the second event to the SCF processors corresponding to the two or more event registration information according to the priorities of the two or more event registration information, and
   wherein, if the number of the SCF processors is one, the event broker transmits a plurality of event information and priority information corresponding to the two or more event registration information to the one SCF processor.

8. The open web service gateway of claim 7, wherein, when the plurality of event information and priority information is transmitted from the event broker, the one SCF processor sequentially transmits events corresponding to the two or more event registration information to the application service in the order of the priorities included in the priority information.

9. The open web service gateway of claim 1, wherein each of the SCF processors comprises:
   a web service processing unit configured to provide the web service interface to the application service so that the application service can access to the SCF processor, and
   a logic processing unit configured to identify whether the first event is an asynchronous or synchronous event, to transmit the registration request of the first event identified as the asynchronous event to the event broker, and to transmit the second event received from the event broker to the application service.

10. The open web service gateway of claim 1, further comprising a policy DB configured to store a plurality of policy data corresponding to the predetermined policy.

11. The open web service gateway of claim 1, further comprising a gateway OAM (operation-and-maintenance) processing unit configured to generate, modify, and remove a plurality of policy data corresponding to the predetermined policy.

12. A method of processing an open asynchronous application service event in an open web service gateway including a plurality of SCF processors, the method comprising:
   receiving a registration request of a first event transmitted from an application service through at least one of the SCF processors;
   registering the first event based on a predetermined policy when the first event is an asynchronous event;
   receiving a second event occurring in a network; and
   notifying the second event to the application service through a corresponding SCF processor according to a priority determined based on the predetermined policy.

13. The method of claim 12, wherein the registering of the first event comprises:

determining whether or not event registration information on an event equal to the first event already exists; and determining an event registration priority based on a predetermined policy to register the first event when an event registration conflict is predicted in the registration of the first event due to the existence of the event equal to the first event.

14. The method of claim 13, wherein the event registration information includes one or more of event information, event-associated terminal number information, event registration SCF information, EndPoint information, registration date information, and priority information.

15. The method of claim 14, wherein the notifying the second event comprises:

using event information and event-associated terminal number information of the second event as a triggering condition to determine event registration information corresponding to the triggering condition; and notifying the second event to the application service through an SCF processor corresponding to the determined event registration information.

16. The method of claim 15, wherein the second event is notified to the application service through an SCF corresponding to one event registration information when the number of the event registration information corresponding to the triggering condition is one.

17. The method of claim 15, wherein the notifying of the second event further comprises:

if the number of event registration information corresponding to the triggering condition is two or more, determining priorities of the two or more event registration information, and determining whether or not there is event registration information having a priority of 0;

if there is event registration information having the priority of 0, notifying the second event to the application service through an SCF processor corresponding to the event registration information having the priority of 0 and, if there is no event registration information having the priority of 0, confirming whether or not the number of SCF processors corresponding to the two or more event registration information is two or more; and if the number of SCF processors is confirmed two or more, sequentially notifying the second event to the application service through said SCF processors according to priorities of the two or more event registration information.

18. The method of claim 17, wherein the notifying of the second event notification further comprises sequentially notifying events of the two or more registration information to the application service, starting from the event corresponding to the highest priority, according to the priorities of the two or more event registration information when the number of the SCF processors determined from the two or more event registration information is one.

* * * * *